Dec. 8, 1959  A. J. HILGERT  2,916,676
CONTROL APPARATUS
Filed Dec. 2, 1953  4 Sheets-Sheet 1

INVENTOR.
Adolph J. Hilgert
BY
Attys

Dec. 8, 1959  A. J. HILGERT  2,916,676
CONTROL APPARATUS
Filed Dec. 2, 1953  4 Sheets-Sheet 2
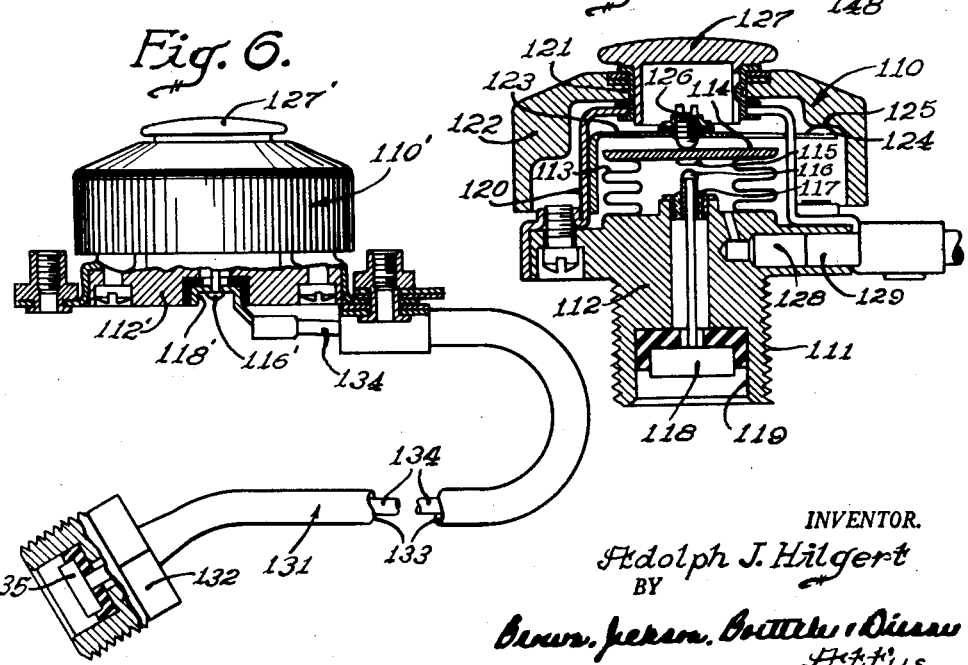
INVENTOR.
Adolph J. Hilgert
BY
Attys INVENTOR.
Adolph J. Hilgert Dec. 8, 1959  A. J. HILGERT  2,916,676
CONTROL APPARATUS
Filed Dec. 2, 1953  4 Sheets-Sheet 4

ARMATURE–POLE FACE AIR GAP

INVENTOR.
Adolph J. Hilgert
BY
Brown, Jackson, Boettcher & Dienner
Att'ys

United States Patent Office 2,916,676
Patented Dec. 8, 1959

2,916,676

CONTROL APPARATUS

Adolph J. Hilgert, Milwaukee, Wis., assignor to Baso Inc., Milwaukee, Wis., a corporation of Wisconsin Application December 2, 1953, Serial No. 395,736

2 Claims. (Cl. 317—165)

This invention relates to improvements in control apparatus, and more particularly to control apparatus which is adapted to be powered by source of small electric energy, for example a thermocouple, and has particular utility for controlling, for example, the flow of fluid fuel to a burner.

In apparatus where fluid flow is controlled by means of a valve, opening movement of the valve is ordinarily against the pressure of the fluid controlled. In the case of fuel control valves, means is usually provided for biasing the valve toward closed position so that, except when the valve is held open, positive sealing of the valve is effected independently of fluid pressure which may tend to close said valve. In order to open a valve of this type a large initial force is required in order to overcome the aforementioned biasing means as well as the inertia and friction of the moving parts, and the pressure of the fuel tending to hold the valve in closed position. In contrast to this, electromagnetic valve operators inherently provide the least amount of force when the armature air gap is the greatest, i.e. at the beginning of the valve opening stroke, and provide the largest amount of force when the armature air gap is the smallest, i.e. at the end of the valve opening stroke.

The output of a single thermocouple under ordinary circumstances is on the order of the 5.5 milliwatts or 20 millivolts to the matched load. It is apparent, therefore, that in order to operate a valve of usable capacity on the power available from a single thermocouple, the valve operator must make very efficient use of this limited power.

In a control apparatus wherein an electromagnetic valve operator is powered by current from a thermoelectric generator subject to the heat of an ignition or pilot burner, the armature of the operator must drop out to close the valve whenever the flame of the pilot burner decreases to a size below which it can no longer safely ignite the main burner. This is accomplish by matching the drop-out current value of the electromagnet to the current output of the thermocouple when the pilot burner flame is of the aforementioned minimum safe size. In order to accomplish drop-out of the armature at a predetermined drop-out current value, means is provided for overcoming the magnetic pull on the armature resulting from the residual magnetism of the electromagnet core, as well as the magnetic pull exerted by the drop-out current. Since the electromagnet provides usable working forces only during pull-in of the armature, the forces necessary to push the armature away from the pole faces of the electromagnet must be stored up during pull-in, for subsequent use upon deenergization of the electromagnet.

With the above in mind, it is a general object of the present invention to provide an improved fuel control apparatus including a valve operator of high efficiency which is constructed in a manner to afford maximum utilization of the work available at the armature.

More specifically, an object of the invention is to provide an improved fuel control apparatus including an electromagnetically operated direct-acting main fuel valve of relatively large capacity and an electromagnetically operated pilot fuel safety shut-off valve, the efficiency of said apparatus being of such a high order that the output of a single thermoelectric generator, for example a thermocouple, affords sufficient power for its operation.

Another object of the invention is to provide an improved control apparatus of the character described wherein the thermoelectric generator supplying the power therefor is subject to the heat of an ignition burner, said apparatus being constructed to provide safe lighting, as well as to provide 100 percent shut-off of the fuel on outage of said ignition burner.

Another object of the invention is to provide an improved control apparatus of the aforementioned character including novel temperature responsive circuit-controlling means for controlling the operation of the main fuel valve, said circuit-controlling means having extremely high sensitivity and low resistance, and being so constructed that failure thereof effects closure of the main fuel valve to provide fail-safe operation.

Another object of the invention is to provide an improved apparatus of the character described wherein high efficiency and maximum utilization of the available power is provided by virtue of the fact that the main fuel valve operator has embodied therein means for storing energy during pull-in movement of the armature, and means for changing the energy storing rate of said energy storing means to conform to the corresponding portion of the pull curve of the electromagnet, the energy stored in said energy storing means becoming effective to open the valve when the energy stored therein plus the pull on the armature overcomes the force tending to hold the valve closed, there being additional energy storing means operably associated with the armature and in which energy is stored during the latter stages of pull-in movement of the armature, the energy stored in said second energy storing means being effective to push the armature from the electromagnet pole faces when the energizing current drops to a predetermined drop-out value. The combined rate at which energy is stored in said first and second energy storing means is in substantial conformity to the pull curve of the electromagnet to provide maximum utilization of the pull-in forces exerted on the armature.

A more specific object of the invention is to provide an improved apparatus of the character described in which the first and second energy storing means each takes the form of a cumulator spring, there being an abutment member coacting with the first cumulator spring at a predetermined point in the pull-in travel of the armature, said member being operable to shorten the effective length of said first spring and to increase its stiffness, thereby increasing its energy storing rate.

Another object of the invention is to provide in an operator of the character described, means for shifting the point in the armature travel at which the change in the energy storing rate of the first cumulator spring is effected, said means including an adjustable mounting for the abutment member coacting with the first cumulator spring. More specifically, the abutment member takes the form of an adjustment screw, adjustment of the position of which shifts the point in the armature travel at which said screw engages the first cumulator spring.

Another object of the invention is to provide an improved operator having a work performing arm, for example a valve carrying arm, there being a flexible hinge spring member on which said arm is mounted for pivotal movement, said hinge member biasing said arm in a valve closing direction to insure closure of the valve member on drop-out of the armature and to provide a friction free pivot for said arm, thereby increasing the efficiency of said operator.

Another object of the invention is to provide a valve operator of the class described which, by virtue of its increased efficiency is capable of operating a large capacity valve, said operator being provided with an improved force transmitting linkage which lends thereto a high degree of compactness while affording relatively large valve movement. More specifically, the improved force transmitting linkage includes a valve arm which overlaps and is linked to the operator armature in spaced relation, said arm and armature being pivotally mounted with their respective axes located on opposite sides of the pole faces of the electromagnet.

Another object of the invention is to provide an improved control apparatus of the character described having a unitary casing for the safety shut-off device and the electro-magnetic operator, said casing providing separate chambers in which said operator and safety shut-off device are accommodated, each of said chambers being provided with a valve seat, said operator and safety shut-off device each being provided with a valve member coacting with one of said seats, and said casing being provided with a removable cover on which said safety shut-off device and operator are mounted for removal from said casing by removal of said cover from said casing.

Another object of the invention is to provide an improved control apparatus of the aforementioned character having means on said casing cover providing for electrical connection of a thermoelectric generator and a thermostat in circuit with the electromagnetic operator, said connections permitting the thermostat to be located either adjacent to or remote from said operator, and there also being provision for response of said thermostat to temperatures sensed by a temperature sensing bulb located at a point remote from said thermostat.

Another object of the invention is to provide an improved operator of the character described wherein means is provided for preventing the valve arm hinge spring from being subjected to stresses, for example shocking stresses, which tend to deform said spring sufficiently to cause the latter to take a permanent set.

Other objects and advantages and numerous adaptations of the invention will become apparent as the description proceeds, reference being had to the accompanying drawings illustrating one complete embodiment of the invention, and wherein like characters of reference indicate the same parts in all of the views. In the drawings:

Figure 4 is a transverse vertical sectional view taken approximately along the line 4—4 of Figure 1;

Figure 4A is an enlarged fragmentary vertical sectional view of a portion of the structure shown in Figure 4;

Figure 5 is an enlarged fragmentary vertical sectional view of the thermostat forming a part of the improved apparatus, said view being taken approximately along the line 5—5 of Figure 1;

Figure 6 is an elevational view of a modified form of the thermostat shown in Figure 5 having provision for location remote from the fuel control apparatus;

Figures 1, 2, 3:
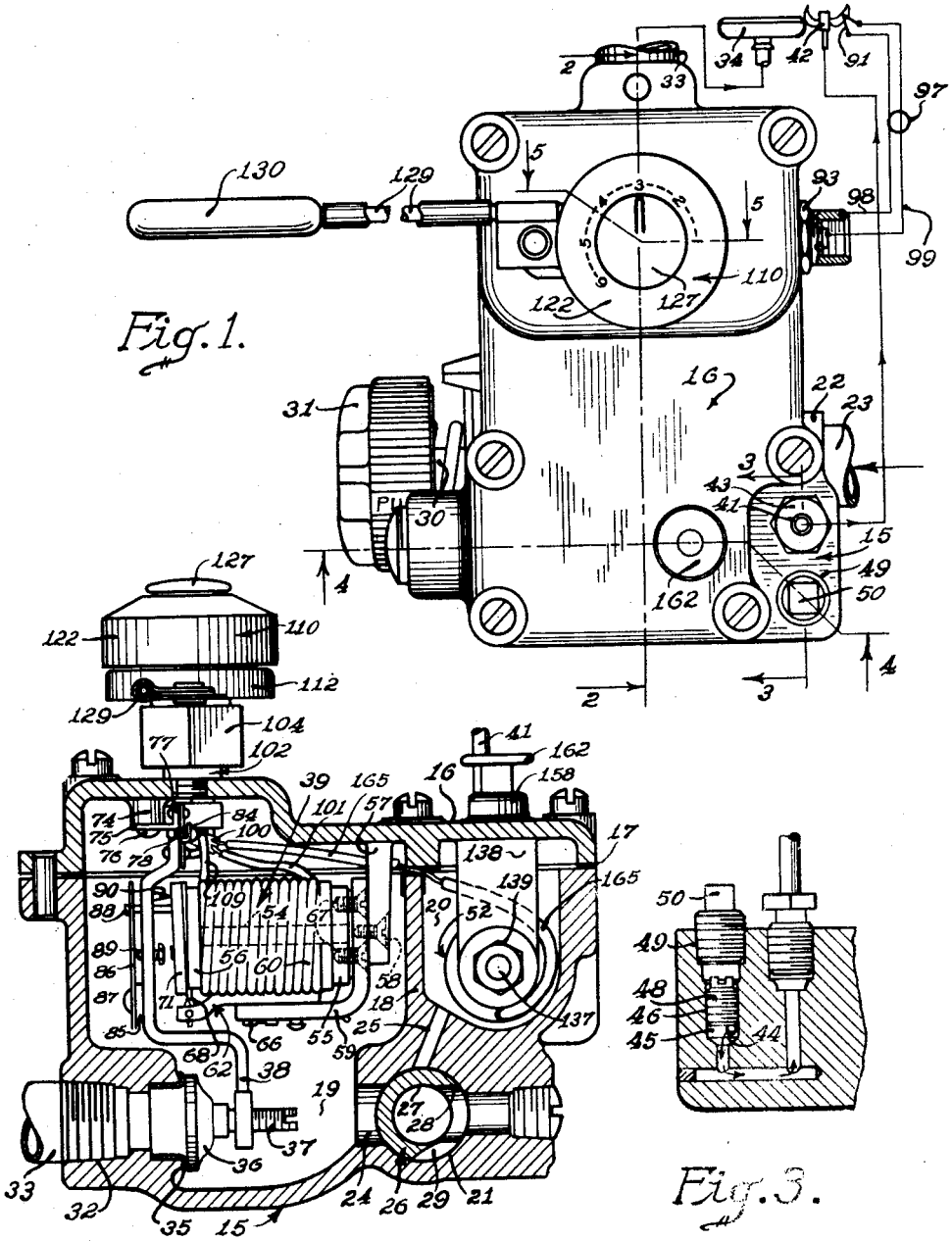
Figure 1 is a plan view of the improved apparatus illustrated semi-diagrammatically as controlling the flow of fuel to a fluid fuel burner provided with a pilot or ignition burner, there being a thermoelectric generator subject to the heat of the pilot burner flame for energizing said apparatus.
Figure 2 is a vertical sectional view taken approximately along the line 2—2 of Figure 1 and showing the valve operator in deenergized condition with the valve member associated therewith in closed position.
Figure 3 is a fragmentary, vertical sectional view taken along the line 3—3 of Figure 1.

Referring more particularly to Figures 2 and 4 of the drawings, the improved control apparatus comprises an electromagnetically operated control device having a casing 15 provided with an open side closed by a cover 16, there being a suitable sealing gasket 17 interposed between said cover and casing. A transverse partition 18 (Figure 2) separates the casing 15 into two chambers 19 and 20, the chamber 19 accommodating a main fuel flow controlling valve 36 and an electromagnetic operator 39 therefor, and the chamber 20 accommodating a pilot fuel controlling valve 52 and a safety shut-off device 53 for actuating the latter. Both the operator 39 and the safety shut-off device 53 are mounted on the cover 16.

The casing 15 is formed with a transverse tapered bore 21 which communicates at its smaller end with a fuel inlet connection 22 (Figure 4), to which a fuel supply pipe 23 is adapted to be connected. As shown in Figure 2, a bore 24 affords communication between the tapered bore 21 and the chamber 19, there being a smaller passage 25 affording communication between the tapered bore 21 and the chamber 20. A tapered plug valve member 26 is seated in the tapered bore 21 and controls the flow of fluid fuel from the inlet connection 22 to the chambers 19 and 20.

The plug valve member 26 is formed with an axial bore 27 and a radial bore 28, said valve member also being formed with a peripheral groove 29 in communication with the bore 28. The valve member 26 is provided with a stem 30 which projects externally of the casing 15 and carries a manually engageable control knob 31 as shown in Figure 4. It is apparent that by rotation of the knob 31 the valve member 26 can be moved from the "off" position shown, wherein no fuel can flow to either chamber 19 or 20, to a "pilot" position wherein the bore 28 registers with the passage 25 and permits fuel flow to the chamber 20 only, or to an "on" position wherein the bore 28 registers with the bore 24 and the peripheral groove 29 registers with the passage 25 to thereby permit fuel flow to both of the chambers 19 and 20.

The chamber 19 is provided with a fuel outlet connection 32 which is adapted to receive one end of a fuel pipe 33 (Figures 1 and 2) which pipe extends to a main burner 34. Within the chamber 19 an annular valve seat 35 surrounds the fuel outlet opening, and a valve member 36 coacts with said seat to control the flow of fuel from the chamber 19 through the outlet 32 to the main burner 34. The valve member 36 is mounted for pivotal movement on a valve stem 37 which, in turn, is carried by an arm 38 which forms a part of the electromagnetic operator 39 to be described hereinafter.

Referring to Figures 1 and 3, the casing 15 is provided with an internally threaded recess 40 to which a pilot fuel supply pipe 41 is connected, as by a connector nut 43. The pipe 41 extends to a pilot burner 42 located in coacting proximity to the main burner 34. As shown in Figures 3 and 4, a passage 44 affords communication between the chamber 20 and a metering chamber 45 provided by an internally threaded bore 46 formed in the casing 15. A U-shaped passage 47 affords communication between the chamber 45 and recess 40. A metering plug 48 is threaded into the bore 46 and controls the amount of fuel flow into the chamber 45 from the passage 44. The bore 46 may be provided with an internally threaded counterbore 49 to receive a closure plug 50 threaded thereinto as shown. The mouth of the passage 44 within the chamber 20 is enlarged to provide a generally conical annular valve seat 51, and a valve member 52 forming a part of the safety shut-off device 53 coacts with said valve seat to control the flow of fuel from the chamber 20 into the passage 44 and hence to the pilot burner 42.

The electromagnetic operator 39 comprises an electromagnet provided with a generally U-shaped low reluctance core of improved construction which enables said core to be utilized in its entirety as a magnetic flux path. The aforementioned core has a pair of parallel core posts 54 connected at one end by a common pole piece or plate 55, said posts being provided at their free end with enlarged pole pieces 56 (see Figures 2 and 8). The pole pieces 55 and 56 are formed with openings in which the ends of the core posts 54 are tightly received. To insure tight fit within the pole pieces, the ends of the core posts 54 are expanded by a swaging operation. After swaging, the core posts and pole pieces are then annealed, preferably in a hydrogen atmosphere, and are thereafter slowly cooled. This treatment fuses the grains of the metal of the previously expanded core posts with the grains of the metal of the pole pieces so that said core posts and pole pieces are thereby formed into a substantially single piece core of extremely low reluctance. The temperature at which the core structure is annealed varies with the type of metal used. For example, when "Alleghany 4750" (an alloy consisting of 50 percent nickel and 50 percent iron) is used, the annealing temperature is approximately 2000° F. On the other hand, when the metal is "Alleghany No. 5 relay steel" (an alloy composed of iron having 5 percent silicon content), the annealing temperature is approximately 1650° F.

It is within the concept of the invention to form the core post and pole pieces from a single piece of metal which, after forming, is annealed as described hereinbefore. However, this would appear to involve more expensive production procedures.

Figure 9:
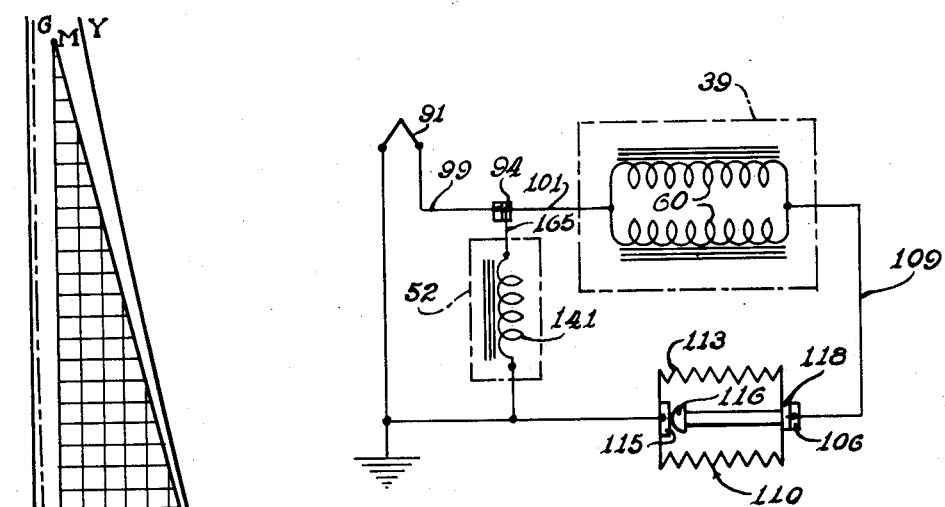
Figure 9 is a diagram illustrating the electrical circuit of the improved control apparatus.

A coil 60 is wound around each of the core posts 54 between the pole pieces 55 and 56, said coils being connected in parallel circuit relationship as shown in Figure 9. Distributing the energizing winding on both of the core posts 54, as distinguished from placing the same number of total turns on only one of said core posts, not only produces a stronger magnet, but it also decreases the total resistance of the winding. This is true because when the winding is distributed on both core posts, the mean length of turn is substantially less than when all of the turns are wound on a single core post. Decreasing the mean length of turn correspondingly decreases the total resistance of the winding. The lowered resistance permits a larger amperage to flow through the winding, and this increase in amperage correspondingly increases the number of ampere-turns resulting from energization of the winding. Since the strength of the electromagnet is a function of the number of ampere-turns, it follows that distribution of the energizing winding on both core posts produces a substantially stronger magnet than placement of all the turns upon a single core post. The lowered total resistance provided by the shorter mean length of turn is of particular importance in thermoelectrically powered apparatus such as the present apparatus wherein any unnecessary resistance causes useless dissipation of substantial proportions of the limited power available from the thermoelectric generator.

Figure 7:
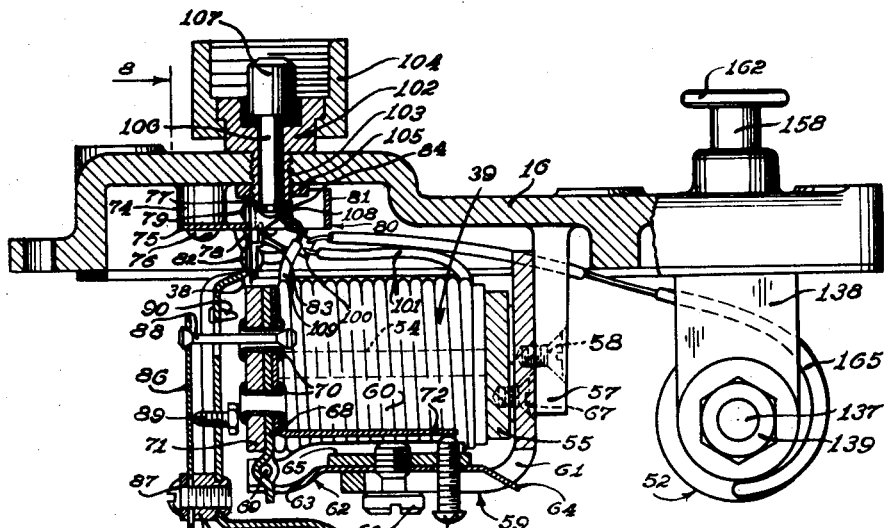
Figure 7 is an enlarged side elevational view, partly in vertical section, showing the electromagnetic operator and the safety shut-off device removed from the casing of the improved apparatus and carried by the cover of said casing, the operator being shown in energized position.

An L-shaped plate 59 has one arm fixed to the plate 55 as by screws 67, and said arm is fixed, as by screws 58, to a pair of lugs 57 which depend from the cover 16. The other arm of the plate 59 extends below and generally parallel with the coil structure and is slotted as at 61 (Figure 7). Positioned on the plate 59 below and between the coils 60 is a channel-shaped bracket 62, one end of which projects beyond the plate 59 and is off-set downwardly, as shown, said end having a central cut-away portion 63. The opposite end of the bracket 62 is provided with a tongue 64 which extends obliquely downwardly and has a snug fit within the slot 61. A plate 65 is positioned within a portion of the bracket 62 overlying the plate 59 and is fixed to said bracket, as by welding. A securing screw 66 extends through the slot 61 and is threaded through the bracket 62 and its plate 65, the head of said screw engaging the plate 59 on opposite sides of the slot 61.

An armature pivot plate 68 is pivotally mounted on the projecting end portion of the bracket 62, as by a pivot pin 69. Fixed to the pivot plate 68, as by tubular rivets 70, is an elongated armature 71 which preferably takes the form of a plate having a size and shape shown most clearly in Figure 8, said armature having a surface area at least as great as, and being adapted to operatively coact with the adjacent pole faces of both of the pole pieces 56. It will be noted that the axis about which the pivot plate 68 and the armature 71 pivot is substantially parallel with the plane of the core posts 54, and is offset laterally therefrom, said axis being disposed at one side of the pole pieces 56 as shown. An L-shaped energy storing push-off spring 72 is also fixed to the pivot plate 68 by the rivets 70, said spring having an arm extending between the coils 60 and engageable with an adjustment screw 73 during the latter part of the pull-in movement of the armature 71, for a purpose to be described hereinafter.

The connection between the bracket 62 and plate 59 provides for longitudinal adjustment of the position of said bracket upon loosening of the screw 66. This connection also greatly facilitates assembly of the operator and insures flat surface contact of the armature with the pole faces on pull-in. During assembly, the armature is held in flat surface contact with the pole faces, and while the armature is so held, the screw 66 is tightened to thereby fix the relationship of the armature to the pole faces on pull-in. The snug fit of the lug 64 in the slot 61 prevents misalignment of the bracket 62 with the plate 59 as well as misalignment of the armature with the pole faces.

Figure 8:
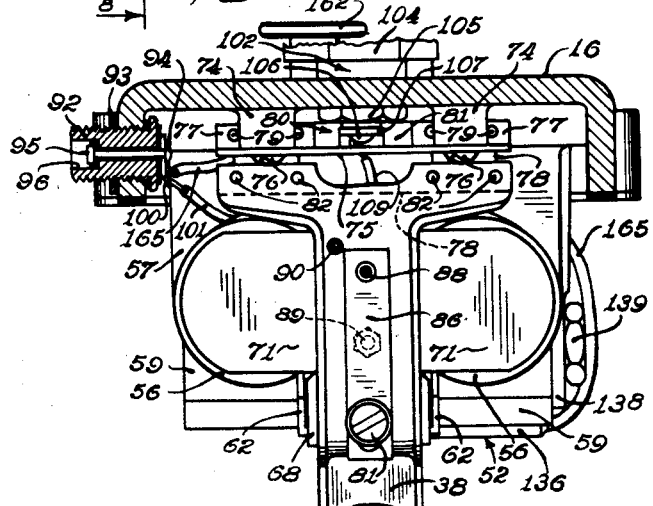
Figure 8 is a transverse vertical sectional view taken approximately along the line 8—8 of Figure 7.

As shown most clearly in Figure 8, the cover 16 is formed with a pair of spaced depending lugs 74 to which a mounting bracket 75 is fixed, as by screws 76, said bracket having an upwardly projecting flange 77 adjacent each of the lugs 74. A flexible hinge member 78, preferably of flat spring steel having a substantially U-shaped outline, has the upper end portions of the arms thereof fixed to the upstanding flanges 77 as by rivets 79, said upper end portion being clampingly engaged between said flange and a back-up plate 80 which is also held in place by the rivets 79. The back-up plate 80 has an off-set central portion 81 as shown.

The valve arm 38 is generally T-shaped when viewed as in Figure 8, and the lower portion of each arm of the flexible hinge member 78 is fixed to the transverse upper end portion of the arm 38, as by rivets 82, said hinge member being clamped by said rivets between the arm 38 and a back-up plate 83 which has a shape generally conforming to the outline of the portions of the hinge member which it overlaps. The plate 83 is provided with a pair of lugs 84 each of which overlaps an end portion of the back-up plate 81 in relatively closely spaced relationship as shown in Figures 2 and 7. The function of the lugs 84 will be described in detail hereinafter. It will be noted that the upper end of the valve arm 38 is spaced below the mounting bracket 75, and as shown in Figure 8, the portions of the arms of the flexible hinge member 78 extending between the upper end of the valve arm 38 and the bracket 75 are of reduced width. The hinge member 78 not only provides a friction free pivotal mounting for the arm 38, but it also performs the very important function of supplying a positive sealing bias to the valve member 36 by virtue of the fact that said hinge member at all times biases the arm 38 in the direction tending to close said valve member on the seat 35 (to the left as viewed in Figures 2 and 7).

As shown most clearly in Figure 7, the valve arm 38 extends across the armature 71 in spaced relationship therewith and in general alignment with the pivot plate 68. The arm 38 carries a tubular bushing 85 to which one end of energy storing leaf spring 86 is fixed, as by a screw 87 threaded into said bushing. The leaf spring 86 extends generally parallel with the arm 38, and the free end of said leaf spring is apertured to receive one end of a link 88. The link 88 extends loosely through a suitable aperture in the valve arm 38 and through one of the tubular rivets 70 as shown, said link having enlarged conical end portions to provide a uni-directional force transmitting connection between the armature 71 and the spring 86.

On pull-in of the armature 71 the free end of the spring 86 is pulled toward the arm 38 by the link 88, to thereby cause energy to be stored in said spring. Means is provided for changing the energy storing rate of the leaf spring 86 during pull-in of the armature, said means, in the illustrated embodiment, taking the form of an adjustment screw 89 carried by the valve arm 38 and providing an abutment member normally spaced from the spring 86 and with which said spring is engageable when the latter has been deformed a predetermined amount by the link 88. Upon engagement of the screw 89 by the leaf spring 86, the effective length of said leaf spring is shortened, and its stiffness is substantially increased, thereby increasing its energy storing rate. The valve arm 38 is also provided with a stop member 90 which projects toward the armature 71 and is engageable thereby upon drop-out of the armature to limit the armature air gap to a predetermined maximum value.

With respect to armature air gap it should be pointed out that both the armature 71 and the pole pieces are plated with a thin layer of suitable non-magnetic material, for example cadmium, to provide a minimum effective air gap between the armature and pole pieces when the armature is in flat surface contact with said pole pieces. A non-magnetic layer from .0002 to .0004 inch in thickness provides a satisfactory minimum effective air gap which reduces the residual magnetic pull on the armature by approximately 200 percent over the residual magnetic pull which results when the armature and the pole pieces are not so plated and are in flat surface contact.

Means are provided for connecting the operator 39 in circuit with a source of electrical energy, for example a thermoelectric generator 91 subject to the heat of the pilot burner 42 (see Figure 1). As shown most clearly in Figure 8, a side wall portion of the cover 16 is apertured to receive an externally threaded sleeve 92 which is held in position by means of a nut 93. A terminal connector 94 insulatably extends within the sleeve 92 and has a terminal tip 95 exposed within a counterbore 96 at the outer end of said sleeve. The terminal tip 95 is adapted to be connected to one terminal of the thermoelectric generator 91, for example by a concentric type lead 97 shown diagrammatically in Figure 1, said lead having a connector nut which is adapted to be threaded on the sleeve 92. The lead 97 has a metallic tubular outer conductor 98 and an insulated inner conductor 99, the inner conductor affording the mentioned electrical connection with the terminal tip 95. The outer conductor of said lead is grounded to the sleeve 92 and is connected to the other terminal of the electric generator 91. Within the cover 16 the terminal conductor 94 is provided with a lug 100, and a conductor 101 affords an electrical connection between the lug 100 and one end of the coils 60.

Means are also provided for inserting a condition responsive, for example temperature responsive, circuit controlling device in the electrical circuit of the operator 39 to provide for control of the flow of energizing current to said operator in response to predetermined changes in the condition. As shown in Figure 7, a tubular fitting 102 has an externally threaded portion 103 of reduced external diameter extending through a suitable aperture in the cover 16. Externally of the cover 16 the fitting 102 carries an enlarged internally threaded connector nut 104 which is rotatable with respect to the fitting 102. A nut 105 is threaded on the portion 103 within the cover 16 and locks the fitting 102 in position. A terminal connector 106 extends insulatably within the fitting 102 and is provided with a terminal tip 107 exposed within the portion 104. Within the cover 16 the connector 106 is provided with a lug 108, and a conductor 109 provides an electrical connection between the lug 108 and the other ends of the coils 60.

Figure 5 illustrates a thermostat 110 of the type which is well adapted for controlling the flow of thermoelectric current. The base of the thermostat 110 is formed with an externally threaded tubular projection 111 which is adapted to be threaded into the connector nut 104 on the fitting 102. Figures 1, 2 and 4 show the thermostat 110 threaded into the nut 104.

As best shown in Figure 5, the thermostat 110 comprises a centrally bored base plate 112 having the aforementioned tubular projection 111, said base plate forming one end wall of an hermetically sealed bellows 113 which also has a movable opposite end wall 114. The end wall 114 carries a movable contact 115 which coacts with a fixed contact 116 insulatably mounted in a glass seal 117. The contact 116 extends within the central bore of the base 112 and projection 111 and is connected in circuit with a terminal tip 118 insulatably mounted within a counterbore 119 at the outer end of the projection 111. It is apparent that when the projection 111 is threaded into the connector nut 104, the terminal tip 118 makes an electrical contact with the terminal tip 107 to place the contacts 115 and 116 in series circuit relationship with the coils 60 of the operator 39.

The bellows 113 preferably contains a thermally expansible and contractible volatile fluid fill in which the contacts 115 and 116 are immersed, said fill being of a type which will not react with the contacts 115 and 116 to form films or to in any other way tend to increase the contact resistance. The fill within the bellows 113, at normal room temperatures, preferably has a pressure below atmospheric, whereby if a leak occurs, the bellows tends to expand and move the contact 115 away from the contact 116. This affords fail-safe operation, as will become apparent hereinafter. Illustrative of sub-atmospheric fills which could be used in the bellows 113 are ethyl ether, isopentane and isopropyl alcohol.

A generally U-shaped bracket 120 is fixed to the base plate 112 and straddles the bellows 113, said bracket carrying a bearing sleeve 121 upon which a rotatable knob or dial 122 is mounted. A leaf type loading spring 123 is fixed at one end of the bracket 120 and has a free end portion 124 in engagement with a cam surface 125 formed on the knob 122. The spring 123 carries an adjustment screw 126 which coaxially engages the bellows end wall 114 and transmits stresses from the loading spring 123 to said end wall. Rotation of the knob 122 causes the cam surface 125 to move the free end 124 of the leaf spring 123 and thereby effect adjustment of the control point of the thermostat. A cap 127 has a friction fit within the sleeve 121 and closes the outer end of said sleeve, removal of said cap permitting access to the adjustment screw 126.

A passage 128 in the thermostat base plate 112 affords communication between the interior of the bellows 113 and a capillary tube 129 which extends to a temperature sensing bulb 130 and permits the thermostat 110 to be responsive to temperatures sensed by the bulb at a point remote from the bellows 113. The bulb 130 and capillary tube 129 may be omitted where not required, in which event, the passage 128 is also omitted.

Figure 6 shows a thermostat 110' which is similar to the thermostat 110 and has provision for location remote from the casing 15. The thermostat 110' has a flexible coaxial cable or lead 131 having an externally threaded connector 132 which can be threaded into a connector nut 104 on the cover 16. The illustrated lead 131 has a metallic tubular outer conductor 133 which is connected in circuit with the base plate 112' of the thermostat 110' and is also connected in circuit with the connector 132. The lead 131 also has an insulated inner conductor 134 which is connected at one end to an insulated terminal tip 118' corresponding to the terminal tip 118 of Figure 5, and said inner conductor is connected at its other end to an insulated terminal tip 135 insulatably mounted within the connector 132 as shown. It is apparent that when the connector 132 is threaded into the connector nut 104, the terminal tip 135 engages the terminal tip 107 to place the contacts of the thermostat 110' in series circuit relationship with the operator 39. If desired, the thermostat 110' may be provided with a capillary tube and temperature sensing bulb such as the tube 129 and bulb 130 of Figures 1 and 5, thereby permitting the thermostat 110', which may itself be located remote from the casing 15, to be responsive to temperatures sensed by a bulb located at another point remote from said casing and also remote from said thermostat.

Referring to Figure 4, the safety shut-off device 53 for controlling the flow of fuel to the pilot burner 42 will now be described. The device 53 is provided with a cylindrical hood or casing 136 having a stud 137 projecting from an end wall thereof and extending through an aperture formed in a lug 138 depending from the cover 16 into the chamber 20, as shown. A nut 139 is threaded on the stud 137 to secure the device 53 in operative position. Fixed within the hood 136 is a U-shaped electromagnet frame 140 having a coil 141 wound on the legs thereof. The coil 141 has one end (not shown) grounded to the casing 136, and has its other end connected to the lug 100 by means of a conductor 165 as shown in Figures 2, 7 and 8.

A circular armature 142 is positioned within the hood 136 and is movable axially toward and away from the pole faces of the magnet frame 140. A stem 143 is fixed coaxially to the armature 142 and slidably projects through a suitable bearing (not shown) in the end wall casing 136 opposite that from which the stud 137 projects. Fixed to the outer end of the stem 143 as by a pin 144 is a cup-shaped retaining member 145. A coiled compression spring 146 surrounds the stem 143, said spring having one end in abutment with the adjacent end wall of the hood 136 and having its other end positioned within the member 145 and in abutment with the end wall thereof as shown in Figure 4A. The member 145 is formed with an axial bore through which the stem 143 extends, as well as an axial cylindrical recess 147. Adjacent its open end the member 145 is provided with a peripheral radially outwardly directed annular flange 148. Outwardly of the transverse bore within which pin 144 is received, the stem 143 is formed with a circumferential groove 149. The valve member 52 is generally cylindrical at one end and is rounded at the opposite end as shown, and the cylindrical end portion of said valve member 52 is formed with an axial cylindrical recess 150 which is adapted to snugly receive the end portion of the stem 143. Within the recess 150 the valve member 52 is formed with an annular rib 151 which is adapted to seat in the circumferential groove 149. The cylindrical end portion of the valve member 52 has a snug fit within the recess 147 of the valve member 145 as shown. The valve member 52 is made of a suitable resilient material, for example polyacrylate synthetic elastomeric material.

The valve member 52 has a snap-on fit on the stem 143, and is preferably snapped onto said stem before the member 145 is pinned to said stem, the member 145, at the time the valve member 52 is snapped onto said stem, being slid axially toward the armature 142. After valve member 52 is in place on the stem, the member 145 is slid axially toward said valve member so that the cylindrical end of the said valve member is received in the recess 147. The member 145 is then secured to the member 143 by insertion of the pin 144. The interengagement of the annular rib 151 and the groove 149 tends to prevent removal of the valve member from the stem 143. Radial spreading of the open end of the valve member which would tend to permit displacement of the rib 151 from the groove 149 is prevented by virtue of the radial confining action afforded by the snug fit which the valve member 52 has within the recess 147. The coiled compression spring 146 biases the valve member 52 toward the valve seat 51, and at the same time biases the armature 142 away from the pole faces of the electromagnet frame 140.

Means are provided for manually resetting the armature 142 into engagement with the pole faces of the magnet frame 140 and for simultaneously moving the valve member 52 away from the seat 51 to open position, against the bias of the spring 146. The aforementioned resetting means includes a bell crank lever 152 pivotally mounted, as at 154, on a lug 153 depending from the cover 16 into the chamber 20. The bell crank lever 152 has a pair of legs 155 which straddle the cup-shaped member 145 and are engageable with the peripheral flange 148 of said member. The bell crank lever 152 is also provided with a shoulder 156. The cover 16 is provided with coaxial internal and external bosses 157 and 158 respectively, said bosses having a common bore 159 provided with an inner end portion of reduced diameter. A reset stem 160 extends axially within the bore 159 and has an enlarged end portion 161 within the chamber 20 engageable with the shoulder 156 of the bell crank lever 152. A manually engageable reset button 162 is fixed to the outer end of the stem 160 and has a telescopic fit within the bore 159. A coiled compression spring 163 surrounds the stem 160, having one end in abutment with the reset button 162, and having its other end in abutment with suitable packing or sealing material 164 surrounding said stem at the inner end of the bore 159. The spring 163 biases the reset button 162, stem 160 and its portion 161 outwardly away from the bell crank lever 152. Depressing the button 162 pivots the bell crank lever 152 clockwise, as viewed in Figure 4, thereby moving the armature 142 into engagement with the pole faces of the magnet frame 140 and simultaneously moving the valve member 52 away from the seat 51.

Referring to Figure 9, it will be noted that the coil 141 of the safety shut-off device 52 and the coils 60 of the operator 39 are in parallel circuit relationship with respect to the thermoelectric generator 91. It will also be noted that the thermostat 110 is in series circuit relationship with respect to the coils 60 of the operator 39, but not with the coil 141 of the safety shut-off device 53. Thus, the thermostat 110 can open the electric circuit to the operator 39 without opening the circuit between the generator 91 of the coil 141 of the safety shut-off device 52.

To place the improved fuel control apparatus into operation, the knob 31 of the plug valve member 26 is rotated to the "pilot" position wherein the radial bore 28 of said plug registers with the passage 25 (Figure 2), so that fuel is permitted to flow to the chamber 20 but is not permitted to flow to the chamber 19. The reset button 162 is then depressed to open the valve member 52 and reset the armature 142 to the pole faces of the magnet frame 140. Fuel can now flow to the pilot burner 42, and upon ignition of said fuel at said burner, the thermoelectric generator 91 becomes heated and generates current which energizes the coil 141 and produces a magnetic attraction which holds the armature 142 to the pole faces of the magnet frame 140 against the bias of the spring 146 upon release of the reset button 162. After release of the button 162, the plug valve knob 31 is rotated to the "on" position wherein the radial bore 28 of the plug valve registers with the bore 24 and the peripheral groove 29 of the plug valve registers with the passage 25, so that fuel is permitted to flow to both the chamber 19 and the chamber 20. Assuming that the thermostat 110 is not calling for heat and the operator 39 is therefore deenergized, the valve 36 within the chamber 19 is held closed by the bias of the hinge spring 78 plus the pressure of the fuel acting against said valve member.

The thermostat 110, with its enclosed contacts 115 and 116 immersed in a volatile fluid fill, provides slow-make, slow-break contacts in the thermoelectric circuit, and as utilized in the apparatus of the present invention, may function as a variable resistance in the thermoelectric circuit, in view of the small electric energy involved. Hence, the electromagnetically controlled valve member 36 may be automatically controlled responsive to changes in temperature by merely varying the contact pressure of the contact 115 against the contact 116. Assume now, that the temperature drops and the fill within the bellows 113 contracts to increase the contact pressure of the contact 115 on the contact 116 and thereby reduces the contact resistance to permit current sufficient for pull-in of the armature to flow from the generator 91 through the coils 60 of the operator 39.

Energization of the coils of the operator 39 causes the armature 71 to be attracted to the pole pieces 56 of the operator, the attractive force being lowest when the armature air gap is the largest and increasing as the air gap decreases. Since the force resulting from the initial armature movement is relatively small, and is insufficient to cause opening of the valve 36, the energy produced by the initial armature movement is stored in the leaf spring 86 for subsequent use at such time as the armature travel has reduced the air gap to a point where the magnetic pull plus the energy stored in the leaf spring 86 is sufficient to overcome the forces tending to hold the valve member 36 closed. This point preferably occurs just prior to engagement of the armature 71 with the pole faces 56, and the valve member 36 is pulled away from the seat 35 with a snap action. The valve member 36 is moved to wide open position by return of the spring 86 to its unstressed state. During said action, the energy stored in the spring 86 is released.

During the latter stages of pull-in movement of the armature, the push-off spring 72 engages the screw 73, and after said engagement, continued armature movement causes energy to be stored in said spring for subsequent use in overcoming the residual magnetic pull on the armature when the energizing current is reduced to or below the drop-out value. A minimum armature air gap is afforded by plating the armature and the pole faces with a non-magnetic material, for example cadmium, said layers of plating limiting the magnitude of said residual magnetic pull to that which can be overcome by the energy stored in the spring 72, as will hereinafter more fully appear.

Figure 10:
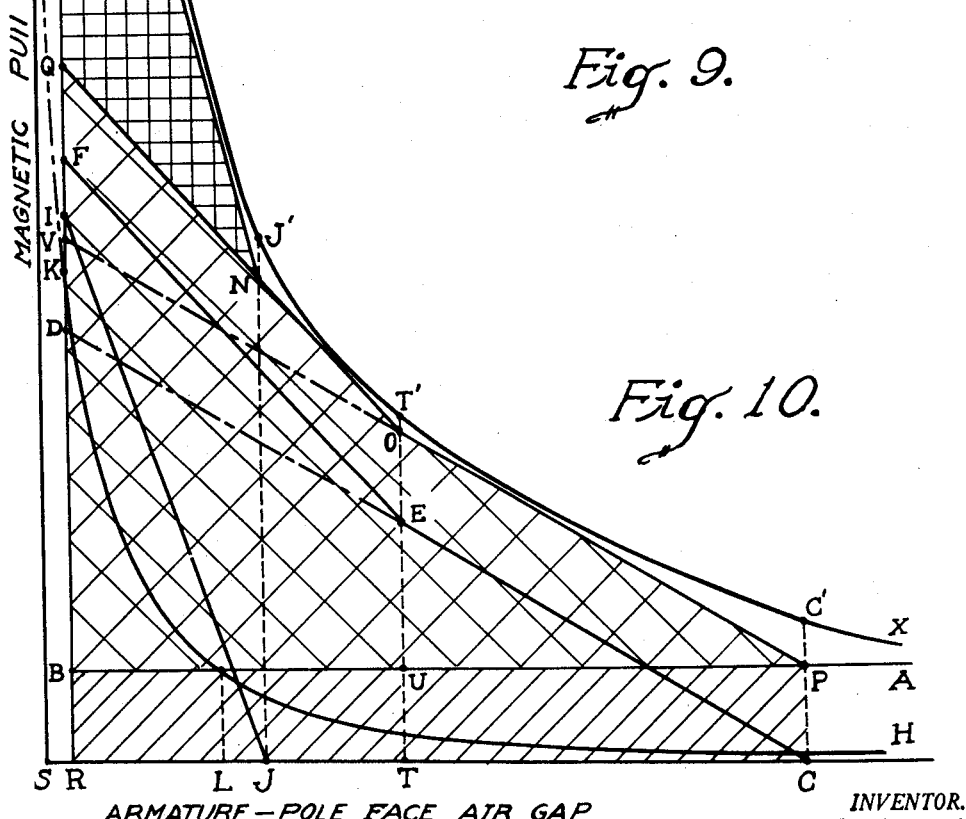
Figure 10 is a graphic representation of the performance characteristics of an electromagnetically operated valve constructed in accordance with the invention.

The improved utilization of the work available at the armature of the operator 39 is most clearly understood by referring to Figure 10, wherein XY is the pull curve of the electromagnet of said operator, i.e., it represents the relationship of the magnetic pull on the armature to the armature air gap when the operator 39 is fully energized. In Figure 10 SR represents the minimum armature air gap provided by the plating on the armature and on the pole faces, the point R representing the attracted or pull-in position of the armature 71 shown in Figure 7. The point C represents the retracted or dropped-out position of the armature 71 shown in Figure 2 and determined by engagement of the armature with the stop member 90. The total travel of the armature on pull-in is therefore represented by the distance CR. The line AB represents the force exerted by the hinge spring 78 tending to hold the valve member 36 closed. The line CD represents the normal spring rate of the energy storing leaf spring 86.

Upon energization of the operator by current from the generator 91 the armature 71 is attracted to the pole faces 56 and begins to move from its retracted position toward said pole faces, i.e., from the point C toward the point R in Figure 10. As previously mentioned, pull-in movement of the armature 71 is transmitted to the leaf spring 86 by the link 88, thereby causing said leaf spring to be bent toward the valve arm 83 to thereby store energy in said leaf. The attractive force tending to move the armature 71 must overcome the biasing force of the hinge spring 78 as well as the force with which the leaf spring 86 resists deformation. In Figure 10 the line PO represents the summation of the forces exerted by the springs 78 and 86 and overcome by the magnetic pull on the armature during movement of the armature from the point C to an intermediate point T. The area under the line PO represents the summation of the area under the portion PU of the line AB and the area under the portion CE of the line CD. Since the aforementioned areas represent work done, it is apparent that the area under the line PO represents total work done by the armature in deforming the springs 78 and 86 during movement of the armature from the point C to the point T. The total work available at the armature during this movement is represented by the area under the portion C'T' of the curve XY. It will be noted that the line PO closely approaches but does not cross the curve XY. This is necessary because if the total force resisting armature movement ever exceeds the pull-in force on the armature, said armature will not be able to move.

If the spring 86 were deformed at its normal spring rate during armature pull-in travel beyond the point T, the line PO would be extended as shown by the line OV, and it will be noted that the line XY pulls away from the line OV rather abruptly. In order to take advantage of the maximum amount of work available at the armature during armature pull-in movement beyond the point T, the spring or energy storing rate of the leaf spring 86 is increased at the point T by causing said leaf spring to engage the end of the adjustment screw 89 at said point, to thereby shorten the effective length of said leaf spring and increase its stiffness. The line EF represents the increased spring rate of the leaf spring 86 after its engagement with the screw 89, and the line OQ represents the summation of the forces exerted by the hinge spring 78 and the leaf spring 86 and overcome by the magnetic pull on the armature during movement of the armature from the intermediate position T to the attracted position R. It will be noted that the portion ON of the line OQ is positioned relatively close to but does not cross the line XY. As the armature approaches the point R, the energy stored in the leaf spring 86 plus the attractive force exerted on the armature overcomes the forces tending to hold the valve member 36 closed and the valve member thereupon opens with a snap action which simultaneously releases the energy stored in the leaf spring 86.

In Figure 10 the line GH represents the residual magnetic pull exerted on the armature as a result of the residual magnetism in the electromagnet core plus the magnetic attraction resulting from the energizing current when the latter is at the drop-out value. It is apparent that residual magnetic pull on the armature increases very rapidly as the armature air gap decreases and that by providing for a minimum air gap as represented by the distance SR, the maximum residual magnetic pull on the armature is limited to the value RK. It is apparent also that when the armature air gap is greater than the distance SL the force exerted by the hinge spring 78 is greater than the force of the residual magnetic pull on the armature.

The hinge spring 78 preferably exerts only enough force so that on drop-out of the armature, positive sealing of the valve member 36 on the seat 35 is provided, independent of the fluid pressure which may be acting on said valve member. The force exerted by the hinge spring is desirably kept as low as possible, since the force of this spring must be overcome, along with the fluid pressure on the valve member 36, in order to open said valve member. The sealing force required of the hinge spring 78 is kept at a minimum by providing the valve member 36 with a flat surfaced resilient facing of synthetic elastomeric material which provides a good seal with minimum pressure.

The hinge spring 78 does not have sufficient force to pull the armature away from the pole faces 56 when the armature is in contact with said pole faces, so additional means is provided for this purpose in the form of the push-off spring 72. The spring 72 is so shaped that the free end thereof engages the end of the set screw 73 as the armature reaches the intermediate point J during pull-in movement. The line JI represents the spring rate of the spring 72, and during pull-in movement of the armature beyond the point J energy is stored in the spring 72 as represented by the area under line JI in Figure 10. It is apparent that between the points L and R all portions of the line JI lie above the curve GH, so that the energy stored in the spring 72 is sufficient to pull the armature away from the pole faces and to move said armature to beyond the point L whenever the energizing current decreases to the drop-out value or below. Beyond the point L the energy stored in the hinge spring 78 takes over and moves the armature to the drop-out point C.

As the armature 71 moves from the point J toward the pull-in point R it must overcome the resisting forces of three springs, namely, the springs 78, 86 and 72. The summation of these forces is represented by the line MN. It will be noted that the line MN closely approaches but does not cross the line XY. The area under the curve XY represents the work available at the armature, and the area under the curve MNOP represents the portion of available work which is actually utilized by the operator 39 during pull-in movement of the armature from the point C to the point R. It will be noted that the line MNOP closely conforms to the curve XY and therefore highly efficient use is made of the work available at the armature. The area CRBP represents the work performed in overcoming the bias of the hinge spring 78 during pull-in of the armature from the point C to the point R. The area PBQOP represents the work done in storing energy in the energy storing spring 86 during pull-in of the armature, whereas the area NQM represents the work done in storing energy in the push-off spring 72 during pull-in movement of the armature from the point J to the point R.

From the foregoing, it is apparent that the present invention provides an electromagnetically operated valve of greatly increased efficient utilization of the power available. Since the capacity of the valve 36 is directly related to the amount of work required to move said valve from closed to open position, the increased efficiency of the instant apparatus, providing substantially increased amounts of useful work available for valve movement, makes possible the control of a large capacity valve 36 as well as the smaller capacity pilot fuel safety shut-off valve 52 with thermocouple power. To illustrate the large fuel capacity which the improved electromagnetically operated valve is capable of controlling with a single thermocouple as its sole source of power, the valve 36 of one form of the invention has a capacity of approximately 45,000 B.t.u., and the valve 52 thereof has a capacity of approximately 8,000 B.t.u.

The electrical and magnetic characteristics of the improved apparatus afford maximum magnetic pull on the armature of the operator 39 in response to energization of said operator by current from the thermocouple, and the improved utilization of the work available at the operator armature is accomplished by virtue of the storage of energy in the spring 86 and in the push-off spring 72. Of particular importance in this respect is the feature of increasing the energy storing rate of the spring 86 at the armature position T, whereby to greatly increase the utilization of the work available at the armature during pull-in movement of the latter beyond the point T. Also of great importance is the maintenance of the minimum armature air gap to reduce the amount of work required to overcome the residual magnetic pull on the armature and hence the amount of energy required to be stored in the push-off spring for this purpose during pull-in of the armature.

During operation of the improved control apparatus the operator 39 is cycled in response to changes in temperature sensed by the thermostat 110 or its bulb 130, said thermostat permitting or preventing sufficient thermoelectric current flow for actuation of the operator as the fill within the bellows 113 contracts or expands. Cycling of the operator 39, of course, opens or closes the valve member 36 on the seat 35 to permit or prevent the flow of fuel to the main burner 34.

The electrical circuit of the improved control apparatus is one of extremely low resistance. The differential required to pull in and drop out the operator 39, neglecting thermal lag of the thermostat 110, is dependent solely upon the electrical constants of the apparatus, that is, the pull-in and drop-out values of the operator 39 in relation to the contact pressure in the thermostat. The inherent differential is so minimal as to be within the thermal lag range of the thermostat 110 which itself is much lower than in previously known temperature responsive devices. This is true because the differential in the instant case is an electrical and not a mechanical one, as for example, inherent in snap-acting thermostats where higher powered circuits are involved and the contacts must be broken quickly to minimize arcing. In the latter type of device the differential not only includes manufacturing tolerances in the mechanism, but it also includes an air gap between the contacts which varies as said contacts wear in use. Furthermore, in such devices additional electrical energy is necessary to supply the force required to overcome the snap-acting mechanism and to power "anticipating" means which must be utilized if the apparatus is to have the required sensitivity. Such extra energy is not available in a thermocouple powered circuit, but, on the other hand, since arcing at the contacts is absent in thermoelectric circuits, there is no necessity for snap-acting means in such circuits. The apparatus of the present application affords great sensitivity and quickness in response (thus eliminating the need for "anticipating" means or the like), and it also provides a minimal differential which remains constant throughout the life of the apparatus. The constancy of the differential is insured by the enclosure of the thermostat contacts and the immersion of the latter in the volatile fill within the bellows to protect said contacts against the formation of oxides, films, or the like tending to increase contact resistance.

In the event of outage of the pilot burner 42 or of a decrease in the size of the flame of said burner to an unsafe point, the current generated by the generator 91 correspondingly decreases to the aforementioned drop-out value which is insufficient to maintain the armature 71 of the operator 39 and the armature 142 of the safety shut-off device 53 in attracted position. As a result, the energy stored in the springs 72 and 78 drops out the armature 71 and causes closure of the valve member 36. At the same time, the bias of the spring 146 of the safety shut-off device 53 pulls the armature 143 from the pole faces of the magnet frame 140 and simultaneously snaps the valve member 52 onto the seat 51 as shown in Figure 4. Closure of the valve members 36 and 52 provides 100 percent shut off of the fuel, and the fuel supply remains completely shut off until the apparatus is again placed in operation by relighting the pilot burner 42 after depression of the reset button 162, in the manner described hereinbefore.

Doubly safe lighting is provided in the improved control apparatus. Firstly, when the plug valve member 26 is turned to "pilot" position no gas can flow to the main burner 34 since the plug 26 prevents fuel flow into the chamber 19. Secondly, even if the plug valve member 26 were turned to "on" position to permit fuel flow into the chamber 19 during lighting of the pilot burner 42, the operator 39, being deenergized until the thermocouple 91 is heated by the flame of the pilot burner 42, holds the valve member 36 closed until after said pilot burner is ignited.

The operator 39 is not only extremely efficient but it is also very compact. The novel hinge spring 78 of the operator 39 contributes to the increased efficiency by virtue of the fact that it provides a pivotal mounting for the valve arm 38 which mounting is devoid of friction. The hinge spring 78 serves the additional function of providing a biasing means supplying the sealing force necessary to hold the valve member 36 sealed against the seat 35 independently of fuel pressures. This dual function effects a reduction in the number of parts, as well as in the cost of the apparatus.

The substantially increased efficient utilization of the work available at the operator armature permits said operator to move the valve member 36 through a greater range to thereby increase the capacity of said valve. In spite of this increased valve member movement, however, the size of the improved operator 39 is actually reduced by virtue of the novel structural arrangement for effecting the desired multiplication of movement between the armature and the valve member. Substantial compactness is afforded the operator 39 by virtue of the aforementioned structural arrangement whereby the armature 71 pivots on an axis located on one side of the pole faces 56 (on the pin 69), and the valve arm 38 pivots on the hinge spring 78 which is located on the opposite side of said pole faces. Because of this relationship it is possible, in a compact structure, to provide movement of the valve 36 which is approximately 3½ times the movement of the armature 71 measured at the link 88. It is obvious that if the armature 71 were pivoted on the same side of the pole faces as the hinge spring 78, it would be necessary to have the valve arm 38 substantially longer than as shown in order to get the desired relationship of valve movement to armature movement. A substantially longer valve arm 38 would, of course, require a much bulkier casing 15.

The improved operator 39 is provided with means for preventing undesirable deformation of the hinge spring 78, for example deformation which would tend to cause said spring to take a permanent set. The aforementioned means takes the form of the lugs 84, which are normally spaced from the back-up plate 81 as shown in Figures 2 and 7, and which permit normal pivotal movement of the valve arm 38 and bending of the hinge member 78. However, in the event that the operator 39 is subjected to a shock causing the armature 71 to engage the stop member 90 with substantial impact so that the arm 38 exerts substantial shearing stresses on the hinge spring 78, the lugs 84 engage the back-up plate 81 to limit the magnitude of said shearing stresses. Engagement of the lugs 84 with the plate 81 thereby prevents the hinge spring 78 from being subjected to shearing stresses of a magnitude which could cause said spring to take a permanent set. In the event that the operator 39 is subjected to a shock in the opposite direction, the armature 71 abuts the pole faces 56 and is prevented thereby from further movement, and therefore no substantial forces are transmitted from the armature to the arm 38 as a result of said shock. Since the mass of the valve arm 38 is relatively small, said valve arm cannot exert sufficient stresses on hinge spring 78 to cause the latter to take a permanent set as a result of the aforementioned shock.

Means is provided in the operator 39 for adjusting the point in the armature pull-in travel at which the energy storing rate of the leaf spring 86 is increased, and means is also provided for adjusting the point in the armature pull-in travel at which the push-off spring 72 begins to store energy. The first of these adjustments is provided by the screw 89 which can be turned toward or away from the leaf spring 86. Depending upon which way the screw 89 is turned the point O in Figure 10 is shifted up or down along the line PV. The push-off spring adjustment is provided by the screw 73 (Figure 7), adjustment of which changes the point in the armature pull-in travel at which the free end of the spring 72 engages said screw. Adjustment of the position of the screw 73 shifts the point N in Figure 10 along the line OQ upwardly or downwardly depending upon which way the screw 73 is turned.

The improved control is so constructed that, with the exception of the plug valve 26, all of operating mechanism can be readily removed from said casing 15 by simply removing the cover 16 from said casing. This removal can be readily accomplished, even though the operator 39 and the safety shut-off device 52 are normally positioned in separate hermetically sealed chambers within the casing 15, and notwithstanding the fact that said operator and device are each provided with a valve member which operatively coacts with a valve seat in its respective chamber. This structural arrangement permits the operator 39 and safety shut-off device 53 to be completely assembled on the cover 16 prior to attachment of the cover 16 to the casing 15. Testing and adjustment of said operator and safety shut-off device are therefore greatly facilitated.

It is also apparent that the structure of the improved apparatus permits the cover 16, operator 39 and safety shut-off device 53 to be safely removed from the casing 15 for inspection, repair or replacement without removal of the casing 15 from the fuel line. Merely turning the plug valve member 26 to the "off" position shown prevents fuel flow into the chambers 19 and 29.

The stop member 90 on the valve arm 38 is so positioned as to limit the drop-out movement of the armature to the position C in Figure 10, wherein substantial attractive forces are exerted upon said coil 60. While this limits the maximum air gap on the armature and hence the amount of work which can be gotten out of the armature at the larger air gaps, it also causes the armature to operate within a range where the attractive forces exerted on armature are the greatest. In the improved operator 39, efficient utilization of the relatively high forces exerted on the armature at smaller armature air gaps is transformed into useful work at the valve member 36 even though the armature travel is relatively small, by substantially multiplying the movement of the valve member 36 over that of the armature. At the smaller armature air gaps sufficient force is provided to actuate the valve member 36, in spite of the aforementioned multiplication of movement. Operation of the armature within the area at which relatively high attractive forces are exerted thereon provides positive operation in contrast to the operation which results when larger air gaps are used in an attempt to take advantage of additional work available at the armature at said larger air gaps. In the latter case, operation at the larger air gaps is uncertain because such factors as friction, inertia and the like, which must be overcome, approach in magnitude the relatively small attractive force exerted on the armature.

The improved control provides an additional safety feature which guards against the dangers of excessive fuel pressures which tend to blow out the flames at the main and pilot burners. Should such a condition occur, dangerous quantities of raw gas would pour from the main burner after pilot burner outage and before the thermoelectric generator could cool sufficiently to cause closure of the valve members 36 and 52. The aforementioned safety feature is provided by constructing the operator 39 so that the maximum pressure against which it can open the valve member 36 does not exceed the maximum safe pressure at which the particular fuel can be burned safely at the main and pilot burners. Whenever the fuel pressure exceeds the maximum design pressure of the control, the valve member 36 cannot be opened by the operator when the thermostat calls for heat. As an example, one form of the invention has a maximum design pressure of 16 inches of water, and when the fuel pressure exceeds this amount, the valve member 35 will not open.

When it is desired to shut down the apparatus completely, the plug valve knob 31 is rotated to the "off" position shown in Figure 2 wherein all fuel flow to the chambers 19 and 20 is cut off. As a result, the pilot burner 42 and the main burner 34 receive no more fuel and become extinguished. The generator 91 thereupon cools, and as the current output thereof drops below the drop-out value of the operator 39 and safety shut-off device 53, the valve 36 closes, if open, and the valve 52 snaps shut.

The specific illustration and corresponding description of the improved control apparatus are used for the purpose of disclosure only and are not intended to impose unnecessary limitations on the claims, or to confine the patented invention to a particular use. It is obvious that various changes and modifications may be made without departing from the spirit of the invention, and all of such changes are contemplated as may come within the scope of the claims.

What is claimed as the invention is:

1. An electromagnetic operator adapted for operation on thermoelectric current or the like, comprising an electromagnet, an armature having a retracted position and movable to an attracted position with respect to said electromagnet by energization of the latter, an actuated member, and force transmitting connection means intermediate said armature and actuated member, said connection means comprising a single leaf spring member through which is transmitted all force from said armature delivered to said actuated member, said spring member being operable to store energy imparted by initial movement of said armature toward attracted position, and adjustable abutment means engageable with said leaf spring member for adjustably shortening the effective length of said spring member and increasing its spring rate at a selected point in the travel of said armature toward attracted position to approximate the force of magnetic attraction on said armature, thereby providing efficient utilization of the energizing current available.

2. An electromagnetic operator adapted for operation on thermoelectric current or the like, comprising an electromagnet, an armature extending across the face of said electromagnet and having a pivotal mounting on one side of said electromagnet, said armature being movable from a retracted position to an attracted position with respect to said electromagnet by energization of the latter, an actuated member, and connection means including a force transmitting linkage between a portion of said armature remote from its pivot and said actuated member, said connection means comprising an arm to which said actuated member is connected and spring means to one end of which said armature is connected, said arm having a pivotal mounting at one end disposed on the opposite side of said electromagnet from said armature pivot, said arm having a portion also extending across the face of said electromagnet, said spring means being connected at its other end to said arm portion intermediate said arm pivot and the connection of said actuated member to said arm, said spring means storing energy imparted by initial movement of said armature toward attracted position, and means for increasing the spring rate of said spring means during travel of said armature toward attracted position to approximate the force of magnetic attraction on said armature, thereby providing in a compact structure efficient utilization of the energizing current available.

References Cited in the file of this patent

UNITED STATES PATENTS

| | | |
|---|---|---|
| 2,263,819 | Ray | Nov. 25, 1941 |
| 2,363,073 | Mantz | Nov. 21, 1944 |
| 2,375,569 | McCarty | May 8, 1945 |
| 2,405,514 | Nield | Aug. 6, 1946 |
| 2,476,794 | Austin | July 19, 1949 |
| 2,506,234 | Nield | May 2, 1950 |
| 2,509,724 | Cibie | May 30, 1950 |
| 2,624,358 | Ray | Jan. 6, 1953 |
| 2,690,189 | Rice | Sept. 28, 1954 |